US007395887B2

(12) United States Patent
Viergever et al.

(10) Patent No.: US 7,395,887 B2
(45) Date of Patent: Jul. 8, 2008

(54) COMPLEMENTARY REGENERATIVE TORQUE SYSTEM AND METHOD OF CONTROLLING SAME

(75) Inventors: Thomas Patrick Viergever, Shelby Township, MI (US); Martin J Dubois, Monroe, MI (US); Matthew F. Johnston, Boyds, MD (US)

(73) Assignee: Bosch Rexroth Corporation, Hoffman Estates, IL (US)

( * ) Notice: Subject to any disclaimer, the term of this patent is extended or adjusted under 35 U.S.C. 154(b) by 373 days.

(21) Appl. No.: 11/019,201

(22) Filed: Dec. 23, 2004

(65) Prior Publication Data

US 2006/0137925 A1 Jun. 29, 2006

(51) Int. Cl.
*B60L 8/00* (2006.01)
(52) U.S. Cl. .................................... 180/65.2; 180/65.4
(58) Field of Classification Search ................ 180/65.3, 180/65.2, 65.4, 65.6, 65.8; 701/22
See application file for complete search history.

(56) References Cited

U.S. PATENT DOCUMENTS

| 4,132,283 | A | 1/1979 | McCurry |
| 4,351,409 | A | 9/1982 | Malik |
| 4,372,414 | A | 2/1983 | Anderson et al. |
| 4,382,484 | A | 5/1983 | Anderson et al. |
| 4,531,431 | A | 7/1985 | Dreher et al. |
| 4,741,410 | A | 5/1988 | Tunmore |
| 4,986,383 | A | 1/1991 | Evans |
| 5,024,489 | A | 6/1991 | Tanaka et al. |
| 5,088,041 | A | 2/1992 | Tanaka et al. |
| 5,117,632 | A | 6/1992 | Strenzke |
| 5,193,436 | A | 3/1993 | Hamai et al. |
| 5,495,912 | A | 3/1996 | Gray et al. |
| 5,540,051 | A | 7/1996 | Maruyama et al. |
| 5,545,928 | A | 8/1996 | Kotani |
| 5,622,050 | A | 4/1997 | Ishino et al. |
| 5,794,734 | A | 8/1998 | Fahl et al. |
| 5,806,617 | A | 9/1998 | Yamaguchi |
| 5,915,362 | A | 6/1999 | Fuwa et al. |
| 6,166,517 | A | 12/2000 | Wakashiro et al. |

(Continued)

FOREIGN PATENT DOCUMENTS

EP          1 008 483 A2      6/2000

(Continued)

*Primary Examiner*—Christopher P. Ellis
*Assistant Examiner*—Brian Swenson
(74) *Attorney, Agent, or Firm*—Berenato, White & Stavish

(57) ABSTRACT

A complementary regenerative torque system exists for a vehicle including an engine having an accelerator pedal position sensor; a transmission unit; and a drive shaft for driving a pair of wheels for propelling the vehicle. The regenerative torque system selectively stores and supplies energy to the drive train to provide on demand complementary torque thereto. The regenerative torque system may be either hydraulic or electric in nature and may be disposed upstream or downstream of the transmission relative to the engine. A regenerative torque control module is disposed between the accelerator pedal position sensor and the engine control module and intercepts the accelerator pedal position signal and modifies it in response to the mode of operation of the regenerative torque system and forwards the modified throttle signal to the engine control module. Likewise, the regenerative torque control module intercepts signals from the engine control module and modifies the same prior to broadcasting them to the rest of the vehicle's control modules.

22 Claims, 9 Drawing Sheets

U.S. PATENT DOCUMENTS

| | | | |
|---|---|---|---|
| 6,170,587 B1 * | 1/2001 | Bullock | 180/69.6 |
| 6,655,485 B1 * | 12/2003 | Ito et al. | 180/65.6 |
| 6,668,953 B1 | 12/2003 | Reik et al. | |
| 6,712,166 B2 | 3/2004 | Rush et al. | |
| 6,746,366 B2 | 6/2004 | Tamor | |
| 7,079,942 B2 * | 7/2006 | McGee et al. | 701/113 |
| 7,160,224 B2 * | 1/2007 | Hsieh et al. | 477/3 |
| 2006/0137925 A1 * | 6/2006 | Viergever et al. | 180/65.3 |
| 2006/0199695 A1 * | 9/2006 | Miller et al. | 477/2 |
| 2006/0213704 A1 * | 9/2006 | Mack | 180/65.2 |
| 2007/0108838 A1 * | 5/2007 | Shaffer et al. | 303/152 |

FOREIGN PATENT DOCUMENTS

| | | |
|---|---|---|
| GB | 2 065 836 A | 7/1981 |

\* cited by examiner

COMPLEMENTARY REGENERATIVE TORQUE SYSTEM AND METHOD OF CONTROLLING SAME

BACKGROUND OF THE INVENTION

1. Field of the Invention

The present invention is directed to a controller for a complementary Regenerative Torque System (RTS) for a vehicle, the interface to the existing vehicle components, and the associated control thereof.

2. Description of the Related Art

Conventional vehicles have an internal combustion engine as a single source of torque. FIG. 1 depicts a schematic flow chart of the signal and torque flow and associated control of a conventional four wheel drive vehicle. An Accelerator Pedal Position (APP) sensor is often employed to indicate desired engine torque while an Engine Control Module (ECM) controls the engine in response to the APP and other sensed conditions. The ECM communicates with a Transmission Control Module (TCM) which controls the transmission in accordance with APP, engine output torque, engine speed and vehicle speed, amongst other conditions. Such assemblies are well known in the art. These prior art systems do not have the ability to provide complementary or supplemental torque, or the ability to store or otherwise use the tremendous amount of energy wasted during vehicle deceleration.

The prior art has presented a wide variety of vehicular systems designed to capture and store a portion of the kinetic energy lost to brake heating in a decelerating vehicle, and to use the stored energy to re-accelerate the vehicle. Such systems often convert the torque of a drive shaft somewhere between the transmission and the axle of the vehicle drive wheels. Some systems employ electric hybrid components consisting of electric motor generators, batteries, and capacitors to convert kinetic energy while braking to electrical potential energy for driving the motor when torque is needed. Other systems employ hydraulic hybrid components consisting of pumps, motors and accumulators to convert kinetic energy while braking to hydraulic potential energy for driving the motor when torque is needed.

An example of a hydraulic RTS employs an integrated Pump Motor (P/M) which is driven by the drive train of the vehicle. The P/M shifts between a generative pump mode to charge a hydraulic accumulator and a motor mode which supplies torque to the drive train. Such pump motors are well known to those of ordinary skill on the art. Many such designs include a variable displacement P/M with a swash plate. When the swash plate is at zero angle, the pistons of the P/M are not reciprocating with respect to the cylinder block and the P/M is neither pumping nor motoring. The position of the swash plate is controlled in response to the mode of operation of the RTS. When braking, the P/M becomes a pump which charges a pressure accumulator. When accelerating, the pressure accumulator powers the P/M which then acts as a motor supplying torque the drive train.

All such prior devices and systems are costly and difficult to be installed with control systems of existing vehicles and are not especially adapted for simple integration with an existing control system and fail to provide the benefits associated with the assembly according to the present invention.

SUMMARY OF THE INVENTION

The present invention is directed to a controller for a complementary RTS for a vehicle including an engine with associated controller; an APP sensor; a transmission unit with associated controller; a drive shaft for driving a pair of wheels for propelling the vehicle; and a regenerative torque unit. The regenerative torque unit selectively stores and supplies energy to the drive train to provide on-demand complementary torque thereto. The regenerative torque unit may be disposed upstream or downstream of the transmission relative to the engine. The Regenerative Torque Control Module (RTCM) is disposed between the existing vehicle wiring harness and the ECM, or other control modules as required, and intercepts pertinent signals entering and leaving the control modules and modifies the same signals in response to the mode of operation of the RTS. The invention allows the addition of a RTS to a vehicle without modification to the existing engine controller, transmission controller, or other system controllers. The invention also provides fail safe modes of operation in which the control signals revert to their original values in the event of a RTS failure.

DESCRIPTION OF THE PREFERRED EMBODIMENT

Figure 1:
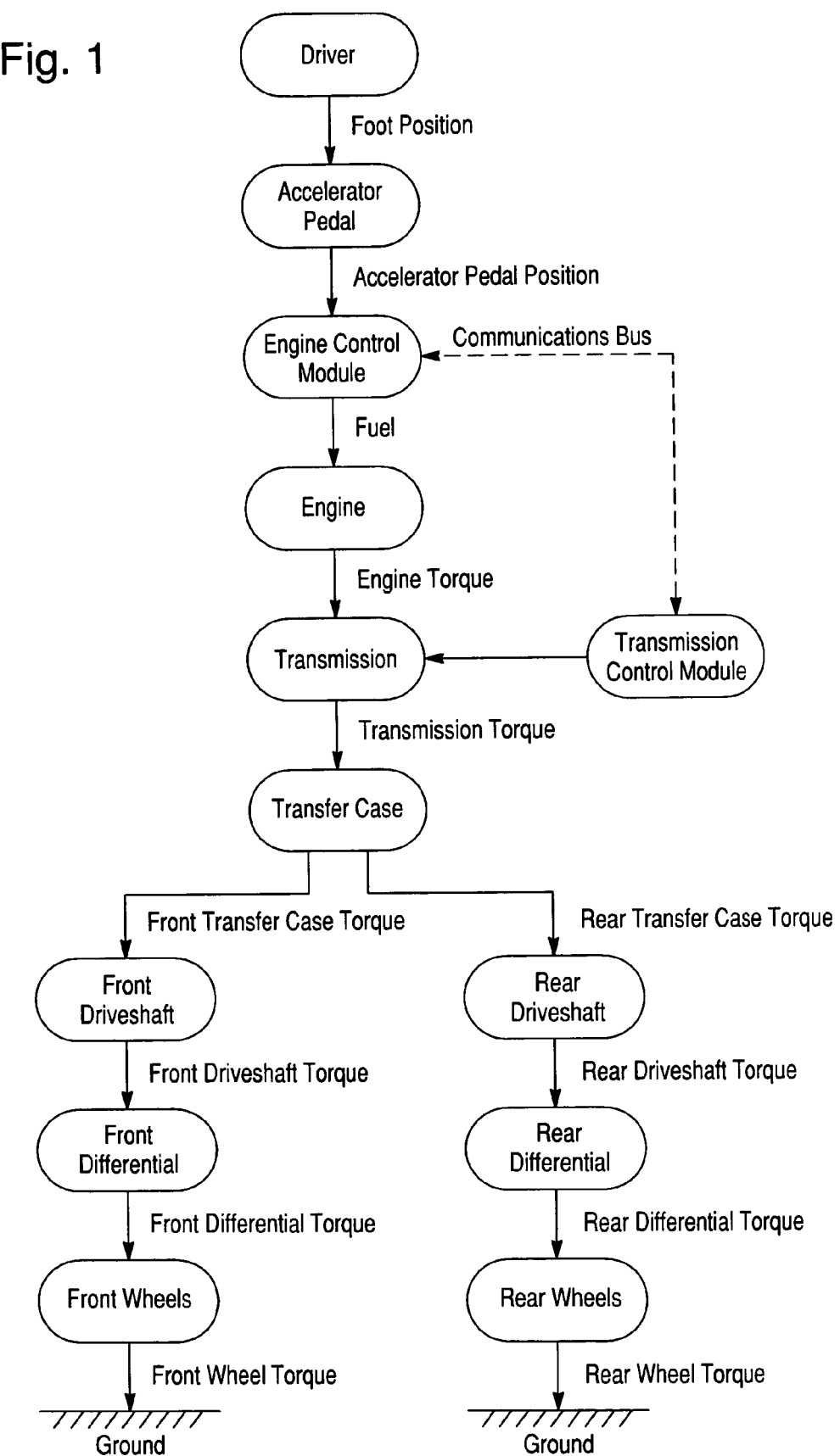
FIG. 1 is a schematic flow chart of the signal and torque flow and associated control thereof in a conventional four wheel drive vehicle.
Figure 2:
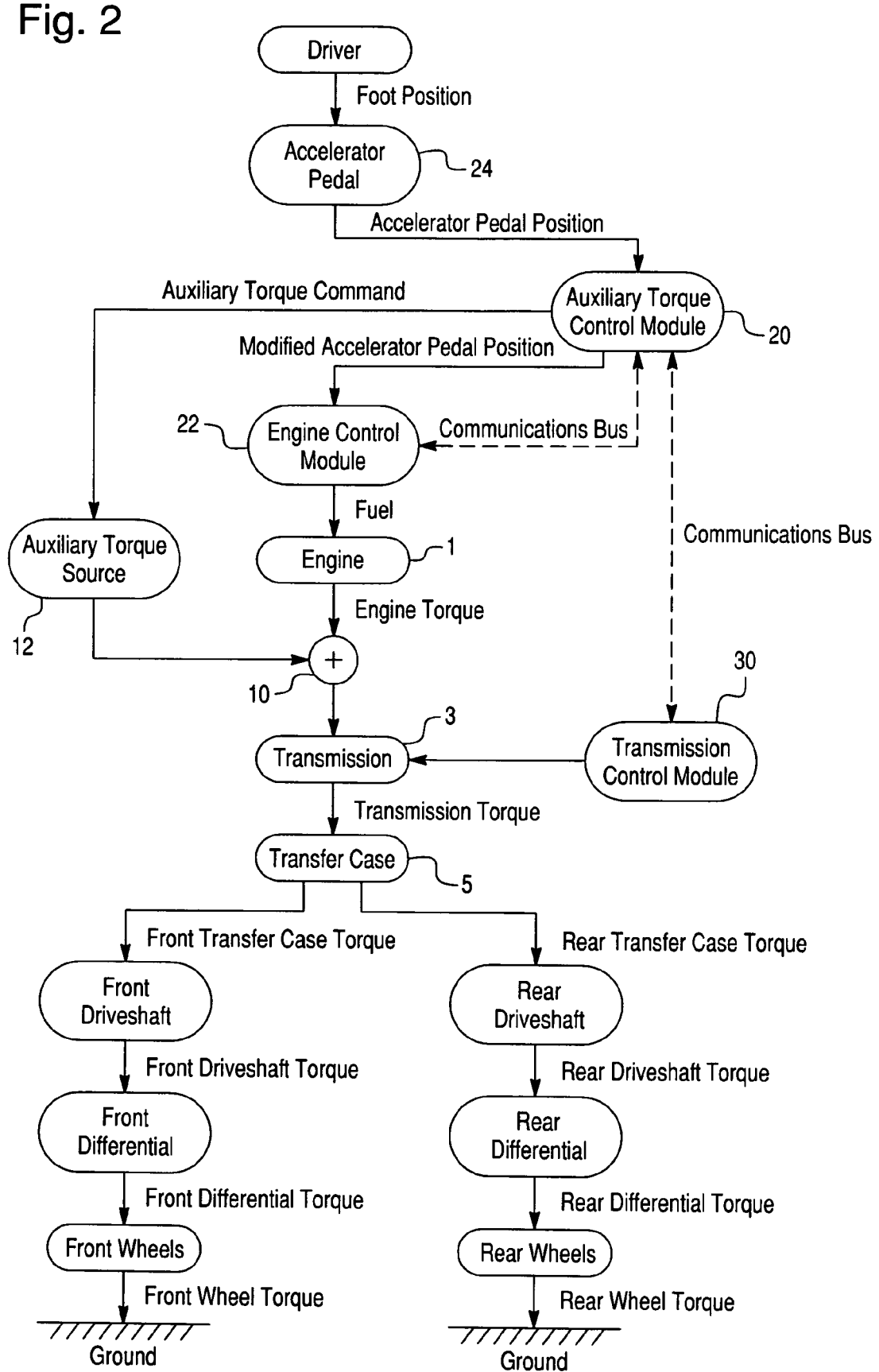
FIG. 2 is a flow chart depicting the signal and torque flow and associated control thereof in a four wheel drive vehicle according to the present invention.
Figure 3A:
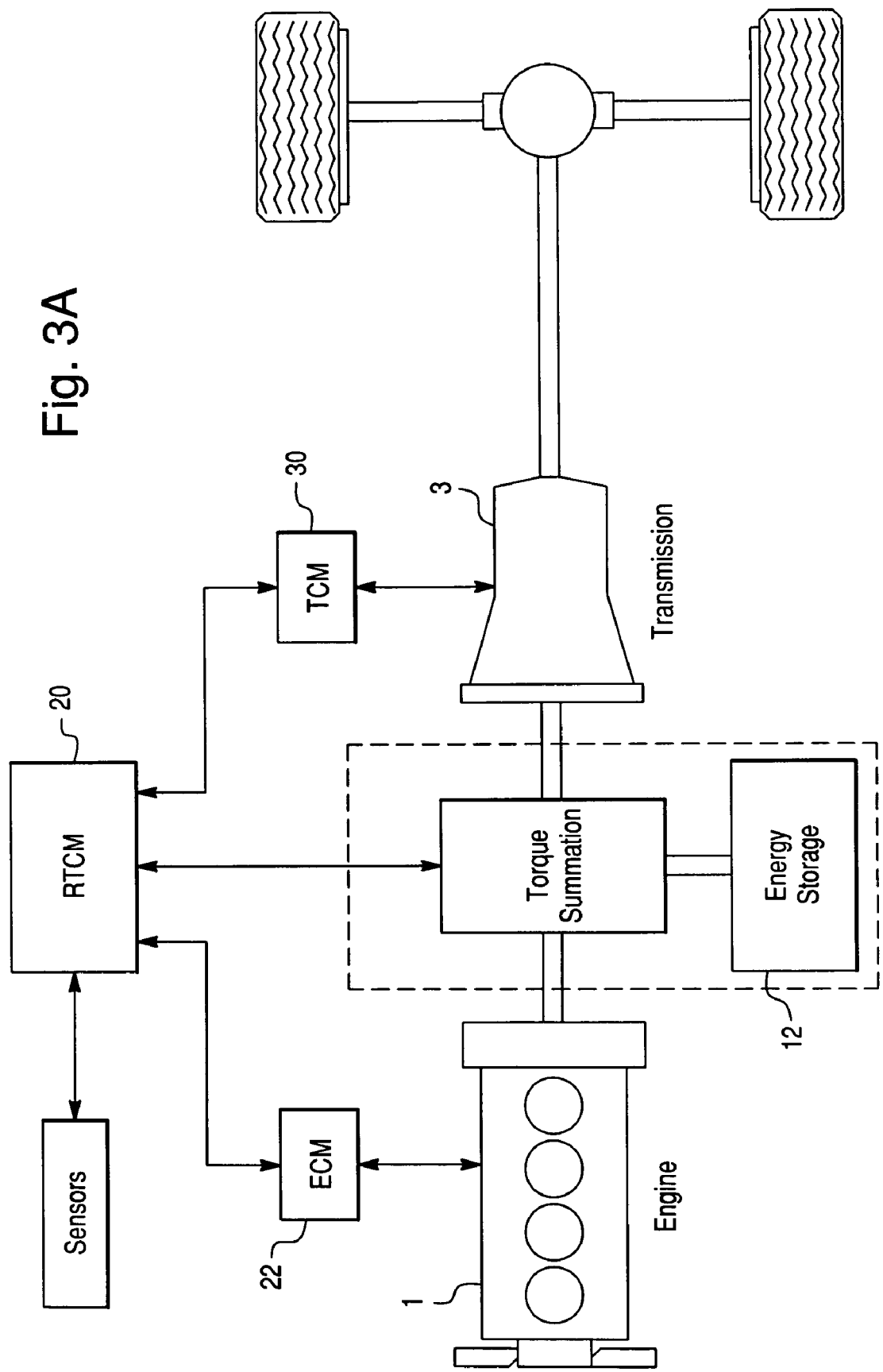
FIG. 3a is a schematic depiction of the RTS according to the present invention in a two-wheel drive vehicle, with the RTS between the engine and the transmission.
Figure 3B:
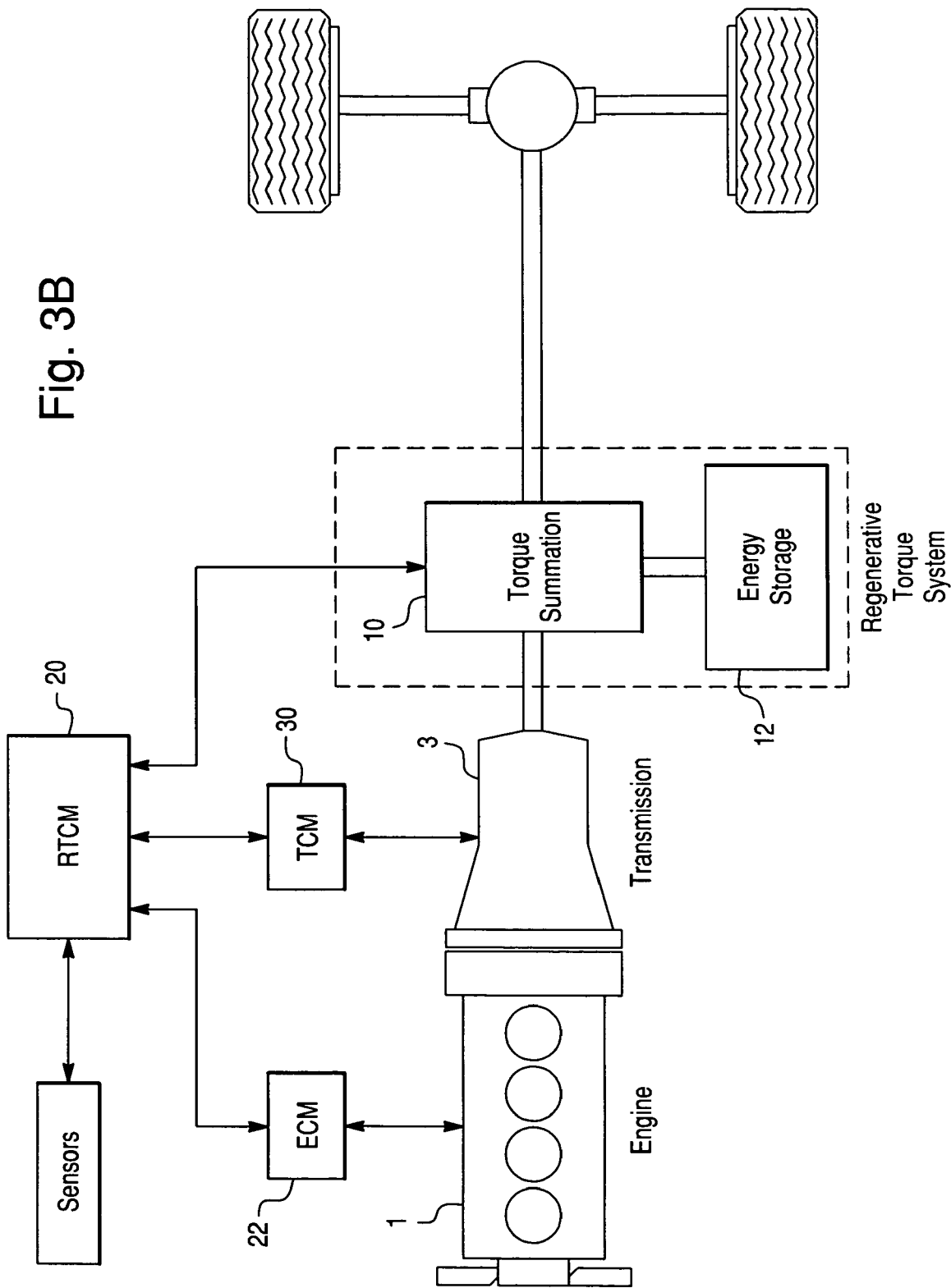
FIG. 3b is a schematic depiction of the RTS according to the present invention in a two-wheel drive vehicle, with the RTS between the transmission and the driveshaft.

FIGS. 2-3 depict an assembly according to preferred embodiments of the invention. An internal combustion engine 1 serves as a primary source of torque for driving a drive train which includes a transmission 3, associated drive shafts, differentials between driven wheels, and in the case of four wheel drive vehicles, a transfer case 5 to provide torque split between front and rear axles. A regenerative torque source (12) is employed for supplying auxiliary torque on demand to the drive train and for storing energy during deceleration/vehicle braking. A torque summation device (Such as integrated pump/motor)(10) is disposed between the engine and transmission in one preferred embodiment.

The present invention is particularly suited for delivering complementary torque to the drive train as needed. The amount of torque delivered to the transmission is the sum of the torque supplied by the engine and the torque supplied by the regenerative torque source. Depending on vehicle conditions, such as torque demand, and the amount of torque available from either the engine or the regenerative torque source 10/12, the Regenerative Torque Control Module (20) RTCM serves to control the amount of torque delivered by the engine and regenerative torque source. The RTCM 20 computes how to split the delivery of torque between the engine 1 and regenerative torque source 10/12. Torque supplied by the regenerative torque source may be either supplementary (additive) or complementary (replacement) to the engine torque. The percentage of torque supplied by the engine or regenerative torque source depends on the operating conditions of the vehicle, torque demand, and the available torque that can be supplied by either source at a given time. The resultant torque is the sum of the two torque sources. The RTCM 20 contains the necessary algorithms to control the regenerative torque source for selectively and appropriately supplying torque to the drive train as needed. The engine, on the other hand, is controlled by an (electronic control module) ECM 22, usually supplied by the manufacturer of the engine.

Modern internal combustion engines are very complex. The engines are controlled in response to an array of sensed vehicle conditions. Sensors such as oxygen sensors, vehicle speed sensors, engine speed sensors, and a host of other inputs are all used by the ECM 22 to efficiently manage the engine's performance. Firing sequencing, control of injectors etc. are all dynamic parts of a modern working engine. One of the sensed parameters is the Accelerator Pedal position sensor 24 (APP). Sensing the position of the accelerator pedal provides the primary request for torque from the engine. However, when a regenerative torque source applies complementary torque to the drive line the engine will not be controlled accurately. This is because, for a given torque demand indicated by the APP sensor 24, the engine 1 will attempt to supply the torque as requested by the APP 24 sensor without knowledge that a portion of the desired torque is being supplied by the regenerative torque source 10/12. This may result in an inconsistent torque response from the accelerator pedal. This is undesirable as it makes driving unintuitive, creates a distraction for the driver, and requires a particular skill to handle the operation of the vehicle during regenerative torque delivery. To overcome these problems, the RTCM intercepts and modifies the APP signal.

As previously described, the APP is normally sent directly to the ECM 22. However, in the arrangement of the present invention, the APP is intercepted by the RTCM 20. The RTCM 20 then modifies this signal appropriately when supplying auxiliary torque via the regenerative torque source 10/12. For example, when the driver depresses the accelerator pedal, the vehicle conditions may warrant supplying a large amount of torque via the regenerative torque source 10/12. In such an instance, little torque may be required from the engine 1. If the engine 1 were to receive the original APP signal 24, it would deliver too much torque and the vehicle would not operate in accordance with the driver's expectations. To prevent such a scenario, the RTCM 20 modifies the APP 24 signal to artificially indicate a lesser accelerator pedal depression. This results in an ultimate torque delivery to the transmission 3 in accordance with the driver's desire. As the RTCM 20 requests less torque from the regenerative torque source 10/12, the RTCM 2 modifies the APP 24 as seen by the ECM 22 to cause the engine 1 to increase its percentage of torque as needed. When conditions no longer require the application of any auxiliary torque, the actual APP 24 is sent unmodified to the ECM 22.

In modern conventional vehicles, the ECM 22 also communicates with other system control modules, in particular the Transmission Control Module TCM 30, through a communication bus or other means. The TCM 30 may use the APP 24, engine torque signal or other signals generated by the ECM 22 to implement shift strategy. When complementary torque is being supplied by the regenerative torque source 10/12, the transmission 3 would receive misleading signals from the ECM 22 and shift inappropriately. This is a result of the TCM 30 receiving signals representative of only the torque from the engine 1 when in fact is getting the sum of both engine torque and the torque supplied by the regenerative torque source 10/12. To correct this drawback, the RTCM 20 intercepts the torque signal generated by the ECM 22 and modifies it accordingly as it supplies auxiliary torque from the regenerative torque source. The modified torque signal consists of a scaled sum of the percentage of engine torque and auxiliary torque. In this manner other control modules connected to the vehicle's communication bus are unaware of the torque split. For transmissions that utilize the APP 24 sensor, this signal may be modified by the RTCM 20 as well.

Figure 4:
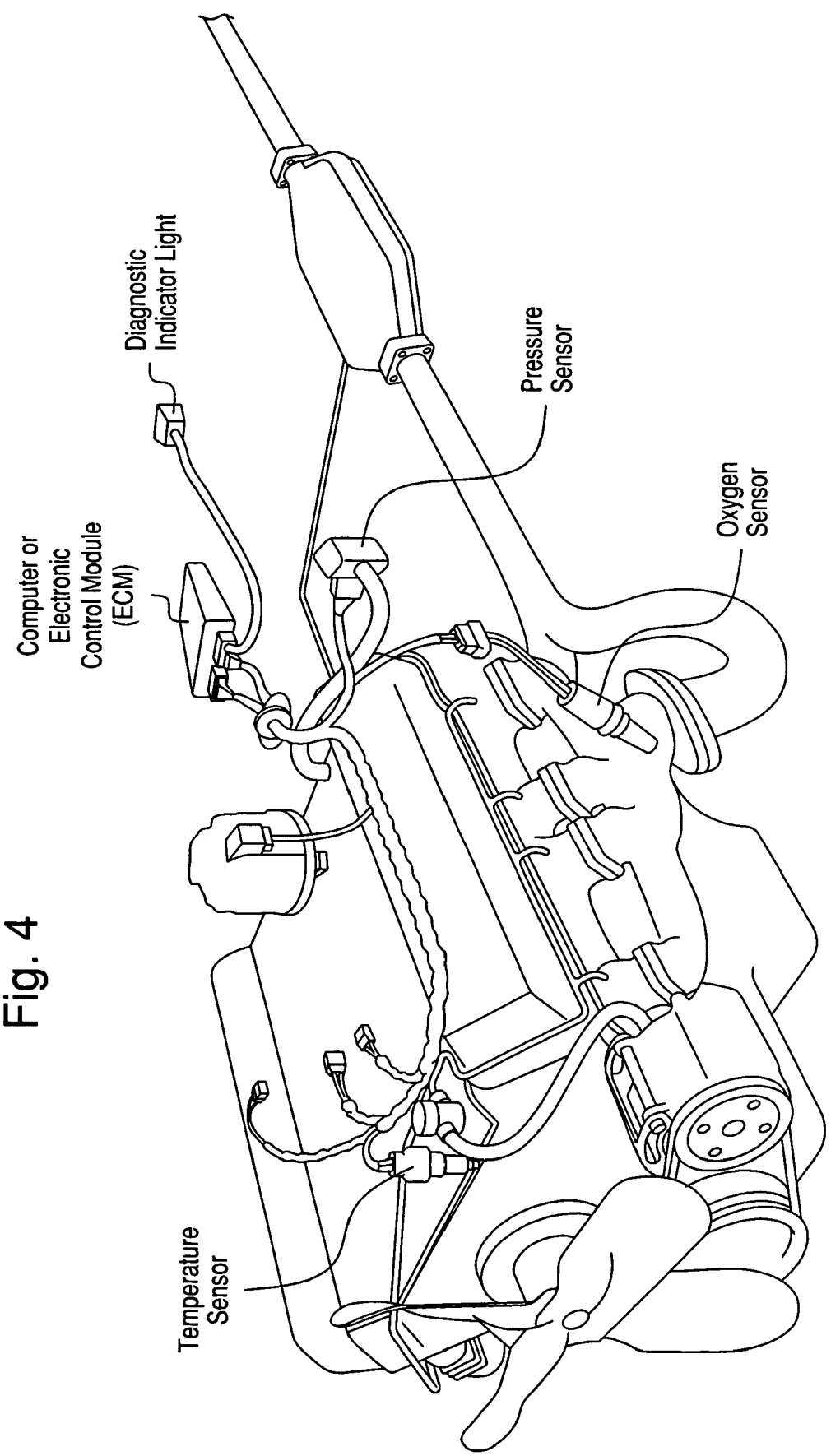
FIG. 4 is a conventional internal combustion engine with a wire harness bundle connected to an engine's ECM.
Figure 5:
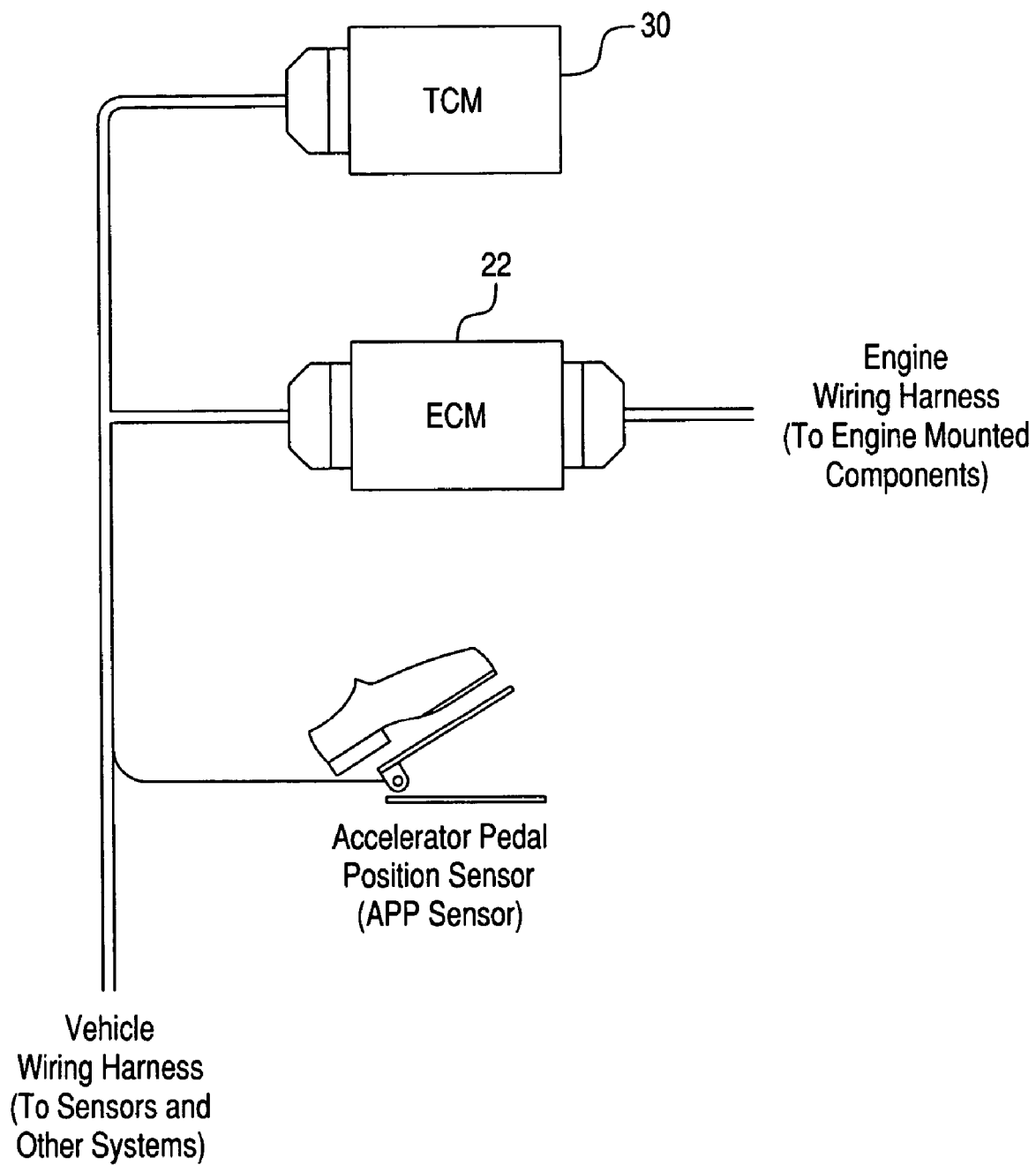
FIG. 5 is a wire harness schematic of the internal combustion engine of FIG. 4.
Figure 6:
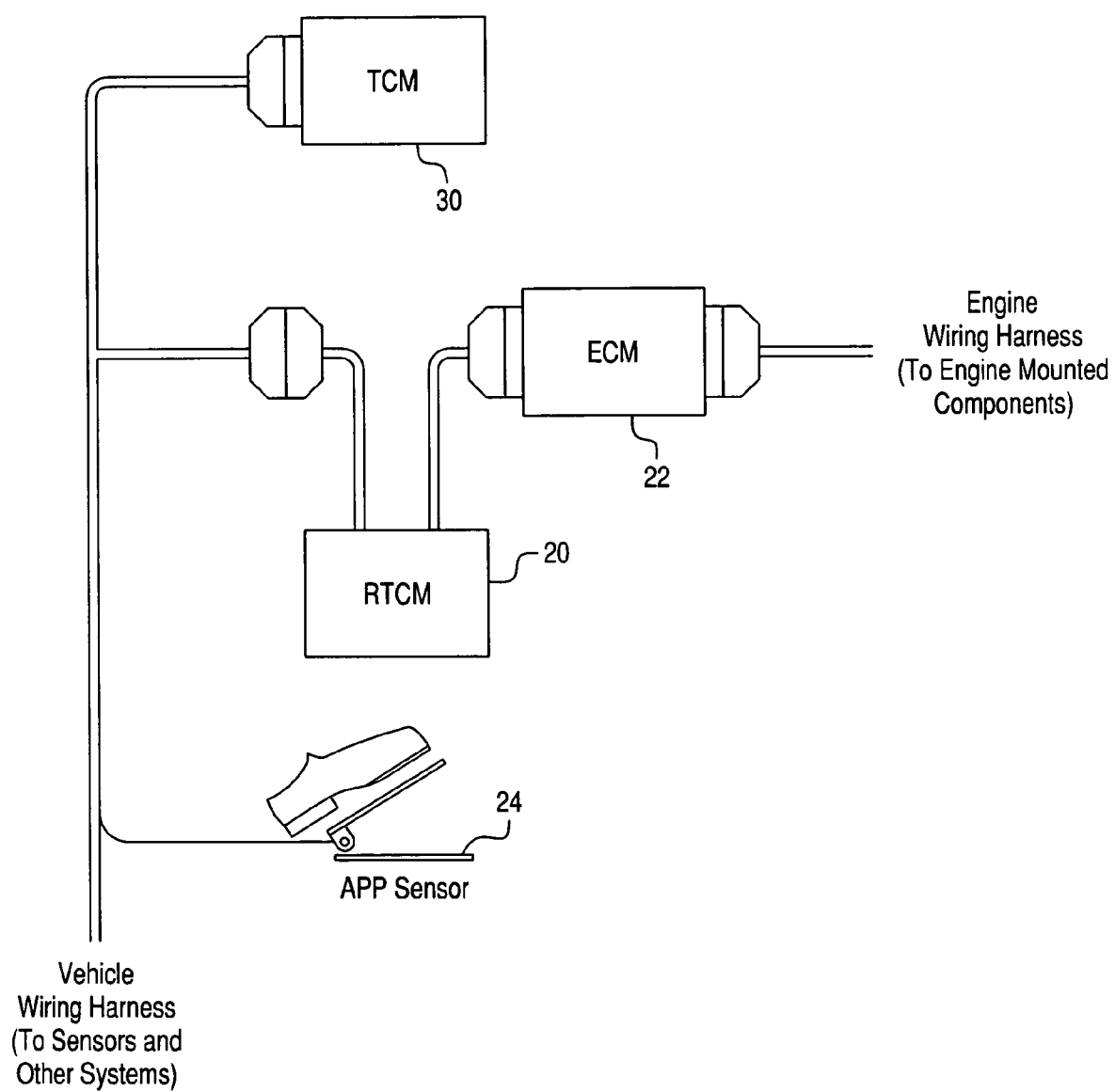
FIG. 6 is a wire harness schematic according to the present invention implemented with a single module interface.
Figure 7:
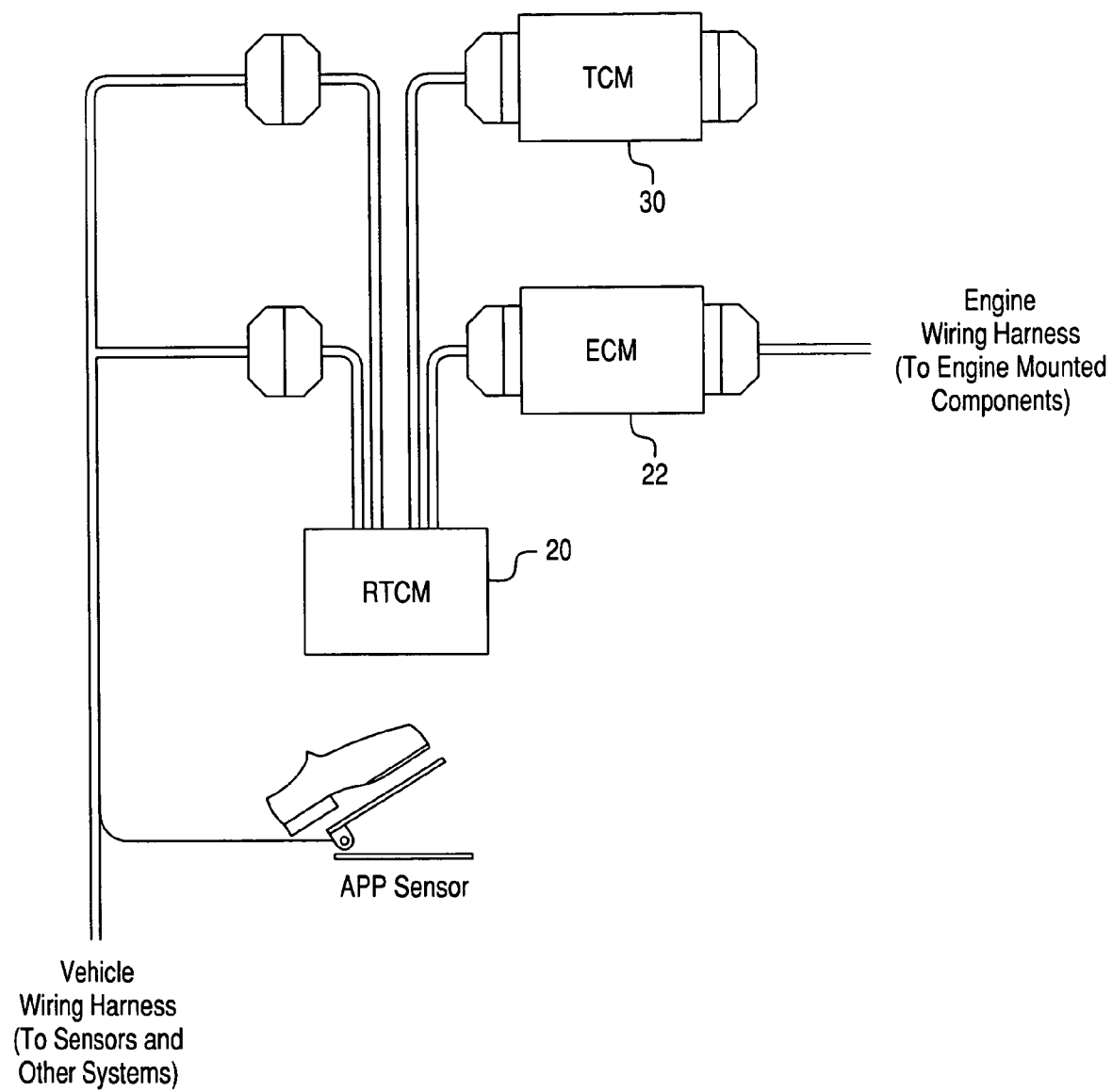
FIG. 7 is a wire harness schematic according to the present invention implemented with a multiple module interface.

FIG. 4 depicts a perspective view of a conventional engine with an ECM. FIG. 5 shows an engine wiring harness connected to the ECM while a vehicle wiring harness connects the ECM to all the various systems throughout the vehicle. Because of the sophistication of modern engines and associated control modules, it not practical to replace the ECM or any other existing control module for every vehicle incorporating a RTS. Such would require a different RTCM 20 for each type of engine/transmission combination. Thus it is desirable to maintain the use of the original ECM 22 and employ a retrofit arrangement whereby the RTCM 20 employs a pass-through device to allow an easy and simple retrofit connection without jeopardizing the original ECM's 22 ability to receive all the various sensed conditions and signals and continue to control all of the various system components. The RTCM 20 controls the RTS and intercepts and modifies only those signals which would otherwise incorrectly influence other control modules or systems. FIG. 6 depicts an implementation according to a preferred embodiment of the present invention. The RTCM 20 is connected to the vehicle wire harness bundle connector ordinarily connected to the ECM 22. The connection mirrors that of the ECM 22. For systems involving multiple signals to different modules (FIG. 7), each wiring harness is duplicated in similar manner. For implementation across multiple engine/ECM 22 platforms, the RTCM 20 may employ an adapter between the RTCM 20 and the wire harness. The RTCM 20 intercepts the APP 24 and any other signal that it needs to modify prior to broadcast to other system controllers. A second wire harness is provided from the RTCM 20 to the ECM 22. For a plurality of bundled wires within the wire harness carrying various signals, they are simply passed through the RTCM 20 unaltered and forwarded to the ECM 22.

The output of the ECM 22 is also channeled back through the RTCM 20. Most of the ECM 22 output signals are simply passed through to the remaining vehicle systems/components. However, the RTCM 20 intercepts the signals such as the engine torque signal. During delivery of complementary torque, the engine 1 is providing only a fraction of the total driveline torque. The RTCM 20 modifies the engine torque signal to reflect the total torque applied to the transmission 3. This signal is sent to the TCM 30 and any other control modules in the vehicle.

During vehicle deceleration, the RTS acts as a storage device. It is known in the art that energy conversion devices, such as pump motors and motor generators, are most efficient at specific speeds and thus are tuned accordingly. Therefore, during deceleration, it is desirable to control the transmission 3 in an effort to rotate the drive shaft within a specified speed range thereby maximizing the efficiency of the energy conversion device and increasing stored energy. The RTCM 20 has full access to all the vehicle sensed parameters. The engine torque, APP 24 and other signals may be modified by the RTCM 20 before being sent to the TCM 30, thus forcing the TCM 30 to maintain shift points beneficial to energy conversion device operation and energy storage. This is valid for the configuration where energy is extracted between the engine 1 and transmission 3. For a RTS extracting torque below the transmission, a similar modification may benefit the energy recovery by maintaining a condition where engine braking is minimized. This mode of operation is a divergence from conventional down-shifting which is largely dependent on having the transmission shifted to make use of engine braking torque. The environment of a hybrid RTS is very much different from conventional drive trains. The invention allows modification of vehicle transmission 3 operation during deceleration, to optimize energy conversion device speed which is heretofore void in the art.

Figure 8:
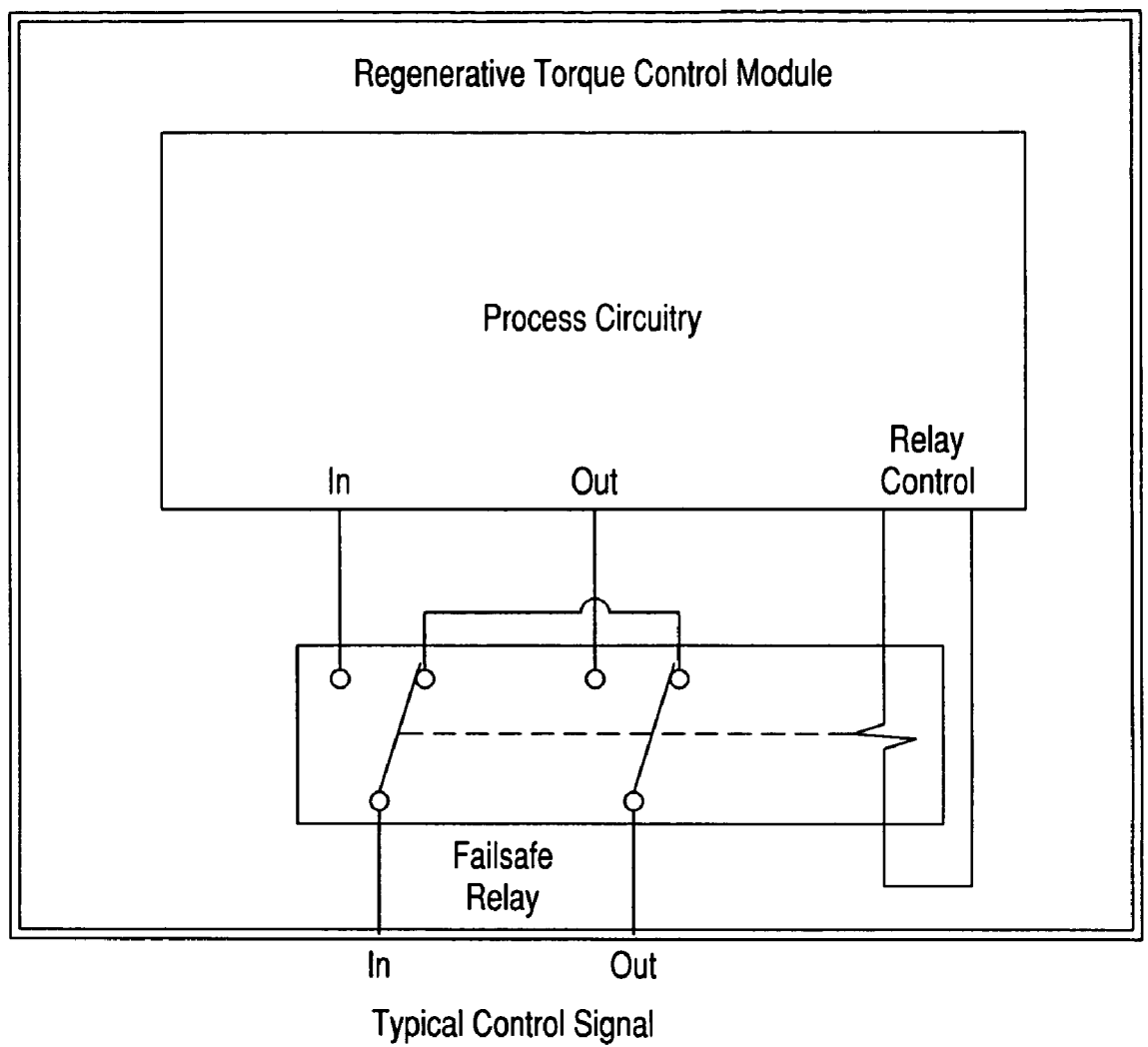
FIG. 8 is a schematic showing the typical pass-through failsafe wiring arrangement according to the present invention.

The RTCM 20 is configured such that in the event that the RTS is disabled or inoperative, the signals that are intercepted by the RTCM 20 are switched automatically so as to pass through the unmodified control signals. FIG. 8 shows the typical mechanism for this failsafe circuit. Each signal entering and exiting the RTCM 20 is switched by a relay or other switching device. The switch defaults to bypass mode. When the RTCM 20 is powered and operating without fault conditions, the relay is switched on, which directs the control signal through the RTCM 20. This arrangement allows the original ECM 22, TCM 30 or other control modules to operate normally in the event of a failure or shutdown of the RTS.

For example, in the event of a power loss to the RTS, the RTS will be unable to store energy, and will be disabled. In this case, the failsafe relay circuitry will de-energize, and the engine, transmission, and other vehicle systems will continue to operate normally. The fail safe relay circuit can also respond to bypass input signals in response to other fault detected operating conditions.

While the foregoing invention has been shown and described with reference to a preferred embodiment, it will be understood by those possessing skill in the art that various changes and modifications may be made without departing from the spirit and scope of the invention.

What is claimed is:

1. A vehicle having a regenerative torque system comprising:
    a drive train including;
        an engine having an accelerator pedal position sensor for sensing accelerator pedal position, said accelerator pedal position sensor generating an accelerator pedal position signal representative of said accelerator pedal position;
        a transmission unit driven by said engine for driving at least a pair of wheels for propelling said vehicle;
    a regenerative torque unit for storing and supplying energy to said drive train to selectively supply on demand complementary torque thereto, said regenerative torque unit disposed upstream said transmission relative to said engine,
    an engine control module for controlling said engine in response to operating conditions;
    a regenerative torque control module disposed between said accelerator pedal position sensor and said engine control module, said regenerative torque control module intercepting said accelerator pedal position signal and modifying said accelerator pedal position signal in response to a mode of operation of said regenerative torque unit.

2. The vehicle having a regenerative system according to claim 1, further comprising a transmission control unit disposed between said regenerative control module and said transmission for controlling said transmission in response to said operating conditions.

3. The vehicle having a regenerative system according to claim 2, wherein said transmission control module selectively controls said transmission during a regenerative mode of said vehicle when said regenerative torque unit is storing energy in response to criteria to maximize efficiency of said regenerative torque unit.

4. The vehicle having a regenerative system according to claim 3, wherein said regenerative torque unit includes an energy conversion device, when said vehicle is decelerating during said regenerative mode said transmission control module sends a signal to shift said transmission to maintain a driven speed of said energy conversion device within a specified speed range.

5. The vehicle having a regenerative system according to claim 4, wherein said regenerative torque control module is disposed between said engine and said transmission control module and intercepts an engine torque signal, said regenerative torque control module selectively modifies said engine torque signal when said regenerative torque unit is supplying complementary torque and sends said modified torque signal to said transmission control module.

6. The vehicle having a regenerative system according to claim 5, wherein said regenerative torque control module intercepts a torque signal from said engine control module and selectively modifies said torque signal in response to vehicle conditions and sends said modified torque signal to said transmission control module; and wherein said regenerative torque control module includes a pass through device passing through a plurality of unmodified signals to a wire harness bundle thereby facilitating a retrofit installation with said wire harness bundle having a single bundled connector ordinarily connected to the engine control module.

7. The vehicle having a regenerative system according to claim 2, wherein said regenerative torque control module intercepts a torque signal from said engine control module and selectively modifies said torque signal in response to vehicle conditions and sends said modified torque signal to said transmission control module.

8. The vehicle having a regenerative system according to claim 2, wherein said regenerative torque control module is disposed between said engine and said transmission control module and intercepts an engine torque signal, said regenerative torque control module selectively modifies said engine torque signal when said regenerative torque unit is supplying complementary torque and sends said modified torque signal to said transmission control module.

9. The vehicle having a regenerative system according to claim 1, wherein said regenerative torque control module includes a pass through device passing a plurality of unmodified signals to a wire harness bundle thereby facilitating a retrofit installation with a wire harness having a single bundled connector ordinarily connected to the engine control module.

10. The vehicle having a regenerative system according to claim 1, wherein said regenerative torque control module includes a pass through device passing a plurality of unmodified signals to a wire harness bundle thereby facilitating a retrofit installation with a wire harness having a single bundled connector ordinarily connected to the engine control unit, said pass through device including fail safe device to pass through all input signals without modification in response to a fault condition.

11. The vehicle having a regenerative system according to claim 10, wherein said fail safe device includes a relay circuit to bypass said input signals through said regenerative torque control module without modification.

12. A vehicle having a regenerative system comprising:
a drive train, said drive train including;
an engine having an accelerator pedal position sensor for sensing accelerator pedal position, said accelerator pedal position sensor generating an accelerator pedal position signal representative of said accelerator pedal position;
a transmission unit driven by said engine for driving at least a pair of wheels for propelling said vehicle;
a drive shaft driven by said engine for transmitting torque to a pair of driven wheels;
an engine control unit for controlling said engine in response to vehicle operating conditions;
a hydraulic regenerative drive unit connected to said drive shaft for selectively driving and being driven by said drive shaft, said hydraulic regenerative drive unit storing energy when driven by said drive shaft in a generation mode and selectively supply on demand complementary torque to said drive shaft when driving said drive shaft in a motor mode of said vehicle,
an engine control unit for controlling said engine in response to operating conditions;
a regenerative torque control module disposed between said accelerator pedal position sensor and said engine control unit, said regenerative torque control module intercepting said accelerator pedal position signal and modifying said throttle accelerator pedal position signal in response to a mode of operation of said hydraulic regenerative drive unit, wherein said regenerative torque control module includes a pass through device passing a plurality of unmodified signals to a wire harness bundle thereby facilitating a retrofit installation with a wire harness having a single bundled connector ordinarily connected to the engine control unit.

13. The vehicle according to claim 12, wherein said drive shaft includes a first drive shaft disposed between said engine and said transmission and a second drive shaft disposed between said transmission and said pair of wheels, said regenerative drive unit being connected to said first drive shaft.

14. The vehicle having a regenerative system according to claim 12, further comprising a transmission control unit disposed between said regenerative torque control module and said transmission for controlling said transmission in response to said operating conditions.

15. The vehicle having a regenerative system according to claim 14, wherein said regenerative torque control module is disposed between said engine and said transmission control unit and intercepts an engine torque signal, said regenerative torque control module selectively modifies said engine torque signal when said regenerative drive unit is supplying complementary torque and sends said modified torque signal to said transmission control module.

16. The vehicle having a regenerative system according to claim 14, wherein said transmission control unit selectively controls said transmission during a regenerative mode of said vehicle when said hydraulic regenerative drive unit is storing energy in response to criteria to maximize efficiency of said hydraulic regenerative drive unit.

17. The vehicle having a regenerative system according to claim 16, wherein said regenerative drive unit includes an integrated pump motor, when said vehicle is decelerating during said regenerative mode said transmission control unit sends a shift to shift said transmission to maintain a driven speed of said pump motor within a specified speed range.

18. The vehicle having a regenerative system according to claim 17, wherein said regenerative torque control module is disposed between said engine and said transmission control unit and intercepts an engine torque signal, said regenerative torque control module selectively modifies said engine torque signal when said regenerative drive unit is supplying complementary torque and sends said modified torque signal to said transmission control unit.

19. The vehicle having a regenerative system according to claim 18, wherein said regenerative torque control module intercepts a torque signal from said engine control module and selectively modifies said torque signal in response to vehicle conditions and sends said modified torque signal to said transmission control unit; and wherein said regenerative torque control module includes a pass through device passing through a plurality of unmodified signals to a wire harness bundle thereby facilitating a retrofit installation with said wire harness bundle having a single bundled connector ordinarily connected to the engine control unit.

20. The vehicle having a regenerative system according to claim 12, wherein said regenerative torque control module intercepts a torque signal from said engine control module and selectively modifies said torque signal in response to vehicle conditions and sends said modified torque signal to said transmission control unit.

21. The vehicle having a regenerative system according to claim 12, wherein said pass through device includes a fail safe device to pass through all input signals without modification in response to a fault condition.

22. The vehicle having a regenerative system according to claim 21, wherein said fail safe device includes a relay circuit to bypass said input signals through said regenerative control unit without modification.

* * * * *